United States Patent
Heimke et al.

(10) Patent No.: US 8,150,704 B2
(45) Date of Patent: Apr. 3, 2012

(54) METHOD OF PREPARING A PRODUCT QUOTE FOR A CUSTOMER

(75) Inventors: Thomas Heimke, Erlangen (DE); Andreas Kuss, Berlin (DE); Peter Schmitt, Baar (CH); Steffen Wagner, Stutensee (DE)

(73) Assignee: Siemens Aktiengesellschaft, Munich (DE)

(*) Notice: Subject to any disclaimer, the term of this patent is extended or adjusted under 35 U.S.C. 154(b) by 1827 days.

(21) Appl. No.: 10/984,634

(22) Filed: Nov. 9, 2004

(65) Prior Publication Data

US 2006/0100952 A1    May 11, 2006

(51) Int. Cl.
    *G06Q 10/00*    (2006.01)
(52) U.S. Cl. .................................................. 705/1.1
(58) Field of Classification Search ............... None
    See application file for complete search history.

(56) References Cited

U.S. PATENT DOCUMENTS

| | | | |
|---|---|---|---|
| 5,546,581 A * | 8/1996 | McKinnis et al. | 712/220 |
| 5,918,004 A * | 6/1999 | Anderson et al. | 714/38 |
| 6,263,457 B1 * | 7/2001 | Anderson et al. | 714/38 |
| 6,385,770 B1 * | 5/2002 | Sinander | 717/170 |
| 6,535,924 B1 * | 3/2003 | Kwok et al. | 709/242 |
| 2002/0066010 A1 * | 5/2002 | Bourke-Dunphy et al. | 713/100 |
| 2002/0073410 A1 * | 6/2002 | Lundback et al. | 717/171 |
| 2003/0018768 A1 * | 1/2003 | Gebhardt et al. | 709/223 |
| 2003/0177486 A1 * | 9/2003 | Bakke et al. | 717/169 |
| 2005/0210461 A1 * | 9/2005 | Srivastava et al. | 717/170 |

OTHER PUBLICATIONS

PR Newsire, Tangram Launches Subsystem to Manage Enterprise Systems Suite Implementations, Unveils Version 2.6 of Asset Insight (R), New York, Oct. 12, 1998, p. 1.*
ProQuest Search.*
Leonard Fischer, "Tips for getting faster support," Gannett News Service, McLean, Sep. 20, 2004 p. 1.*

* cited by examiner

*Primary Examiner* — Gerardo Araque, Jr.

(57) ABSTRACT

The present invention provides an efficient and simple method of preparing a product quote for a customer operating a technical installation.

The product quote is based on a data set acquired during the operation of the installation, a product chosen for use with the installation and a customer benefit related to the chosen product and the data set.

18 Claims, 2 Drawing Sheets

METHOD OF PREPARING A PRODUCT QUOTE FOR A CUSTOMER

FIELD OF THE INVENTION

The present invention relates to a method of generating a product quote for a customer.

BACKGROUND OF THE INVENTION

Theses days, many purchase decisions are based on quotes obtained in advance. As there are many sources of information available, for example using the internet to gather product and price information worldwide or calling a plurality of product providers, it often pays off to compare several offers before making the purchase decision.

SUMMARY OF THE INVENTION

Known quotes are prepared on request, i.e. a prospective customer contacts a product provider and asks for a quote. Usually, the product provider chooses an appropriate product of his product range and argues advantages of the chosen product based on general data or knowledge he assumes to be applicable to the customer.

It is hard to decide both by the customer and the product provider whether the chosen product actually meets the requirements of the customer: The customer has to rely on general product information and can only vaguely anticipate a prospective benefit when purchasing and using the chosen product. This is mainly because the product provider, when choosing an allegedly appropriate product, usually does not know many details about the actual environment and its influencing factors in which the customer intends to use the product. Therefore, the result of the product choice is only suboptimal.

Furthermore, the customer often does not even know that there is an appropriate new, substitute or upgrade product and that its purchase could dramatically enhance his benefit.

It is therefore an object of the invention to provide a simple and effective method of preparing a high-quality product quote for a customer.

One aspect of the invention involves a concept of using a data set acquired during operation of the installation, with which the customer intends to use the product, as a basis for the product quote.

The data set reflects the actual environment, under which the product is to be operated. The product is, for example, a water turbine controller and the data set may include a history of water net head and water volume for the past month, the power load and power set points of the turbine for the last month, the logged output signal of the controller currently used for the last month etc.

A further aspect of the invention includes the product choice to be based upon the data set so that the chosen product fits the intended purpose (and therefore the actual operating situation) to a great extent.

Another aspect of the invention relates to determining a customer benefit, assuming the customer purchases the product and the actual (future) operating situation of the product will be as represented by the data set.

Yet another aspect includes preparing and sending the quote to the customer, wherein the quote includes the chosen product and information on the determined benefit, so that the customer can immediately recognize if it pays off to invest in a product purchase. The benefit stated within the quote is very reliable, because it is determined by taking into consideration real operating parameters of the installation with which the product shall be used.

Another aspect of the invention involves the product quote to be sent to the customer as an unsolicited quote, i.e. without a customer's previous request for a quote, wherein the product provider is already a remote service provider to the customer and therefore has regular access to operational data of the customer's installation over a transmission line, for example the internet. The product & remote service provider regularly analyzes the acquired and transmitted data sets, tries to determine a need (if the data set suggests so, i.e. by including unusual parameter values), matches the need with a product out of his product range, and determines the benefit for the customer by assuming he purchases the chosen product and the (future) operating conditions of the product will be as indicated in the acquired data set or data sets.

The quote shall be sent to the customer preferably as soon as any acquired data set indicates a need for a product purchase, i.e. as soon as possible after a customer benefit can be proved and included in a specific product quote.

A further aspect of the present invention thus involves a system for preparing a product quote for a customer operating a technical installation, comprising:

- a data reading device for reading a data set relevant to the operation of the installation;
- a product data base including product information of a plurality of products;
- a processing device adapted to choosing at least one product for use with the customer's installation out of the plurality of products based upon the data set; and
- a calculating device adapted to calculating a customer benefit based upon the chosen product and the data set, wherein the data set has been acquired during the operation of the installation.

The system preferably is realized by an integrated computer based installation. The processing device includes an analyzing mechanism, for example implemented in a CPU in the form of an algorithm, which analyzes the data set to extract features which can be used as a search criterion when searching the product data base for an appropriate product. The algorithm can include methods of Artificial Intelligence (e.g. neuronal networks, fuzzy logic, neuronal/fuzzy methods etc.) and/or a pattern recognition mechanism.

The calculating device used for calculating the customer benefit can be implemented as a simulation mechanism, which includes a cost model related to the chosen product. The data set is thereby at least partially used as an input data set of the cost model, which determines a cost/benefit related output data set. So the customer benefit included in the output data set is very accurate, because it is based on real data relevant to the expected actual (future) operating conditions of the product.

In order to provide for a fully automated quote preparation, a quote generator is employed to generate the quote. This includes using a blank electronic quote template, filling in product details of the chosen product and adding information related to the calculated customer benefit. The quote generator thereby extracts the product details from the product data base and the calculated customer benefit from the calculating device.

This electronically prepared quote can then be sent to the customer automatically by a mailing device such as an E-mail system.

Further aspects, features and advantages of the present invention will become apparent from the drawings and detailed description of the following preferred embodiments.

BRIEF DESCRIPTION OF THE DRAWINGS

The above-mentioned and other concepts of the present invention will now be addressed with reference to the drawings of the preferred embodiments of the present invention. The shown embodiments are intended to illustrate, but not to limit the invention. The drawings contain the following figures, in which like numbers refer to like parts throughout the description and drawings and wherein.

DETAILED DESCRIPTION OF THE PREFERRED EMBODIMENT

Overview

The disclosed invention advantageously employs one or more base concepts.

It basically provides an efficient and simple method of preparing a quote for a customer operating a technical installation, comprising:
  acquiring a data set relevant to operating the installation during operation of the installation;
  transmitting the data set to a product provider;
  choosing a product for use with the customer's installation based upon the transmitted data set;
  determining a customer benefit based upon the chosen product and the transmitted data set;
  preparing the product quote related to the chosen product; and
  sending the customer the product quote, wherein
  the product quote includes information related to the determined customer benefit.

The data set acquired during operation of the facility relates to operating conditions of the facility and may include online (real time) or logged data influencing the proper operation of the facility such as sensor data originating at components of the facility, for example fluid pressures, bearing temperatures, engine temperature, coolant temperatures, environmental temperatures, electric currents, electric voltages, switch settings, relay trips, closed/open status of doors, valves and so on. Those data indicate under which real operating conditions the facility's components are working.

One concept, therefore, is acquiring the data set relevant to operating the installation during operation of the installation, the data set representing real operating conditions of the installation and its components.

Another concept involves choosing a product from a product data base based on the data set, so that the chosen product meets the actual operating requirements of the installation.

Yet another concept provides calculating a customer benefit, assuming the chosen product is used with the customer's installation under operating conditions as indicated by the acquired data set.

A further concept involves preparing the product quote including product information extracted from the product data base and information related to the calculated customer benefit. Such a quote is very meaningful to the customer, because it not only provides information about product features, but also about (positive) consequences (benefit)—such as reduced costs, increased profit etc.—he can count on when purchasing and using the product with his facility. The calculated customer benefit is thereby very reliable, as it is based on real operating conditions acquired during operation of the installation.

All the embodiments to be described in more detail in the following can be applied to preparing quotes for customers operating all kinds of facilities such as industrial plants, hotels, trains, cars etc. and shall not be limited to any special purpose.

Figure 1:
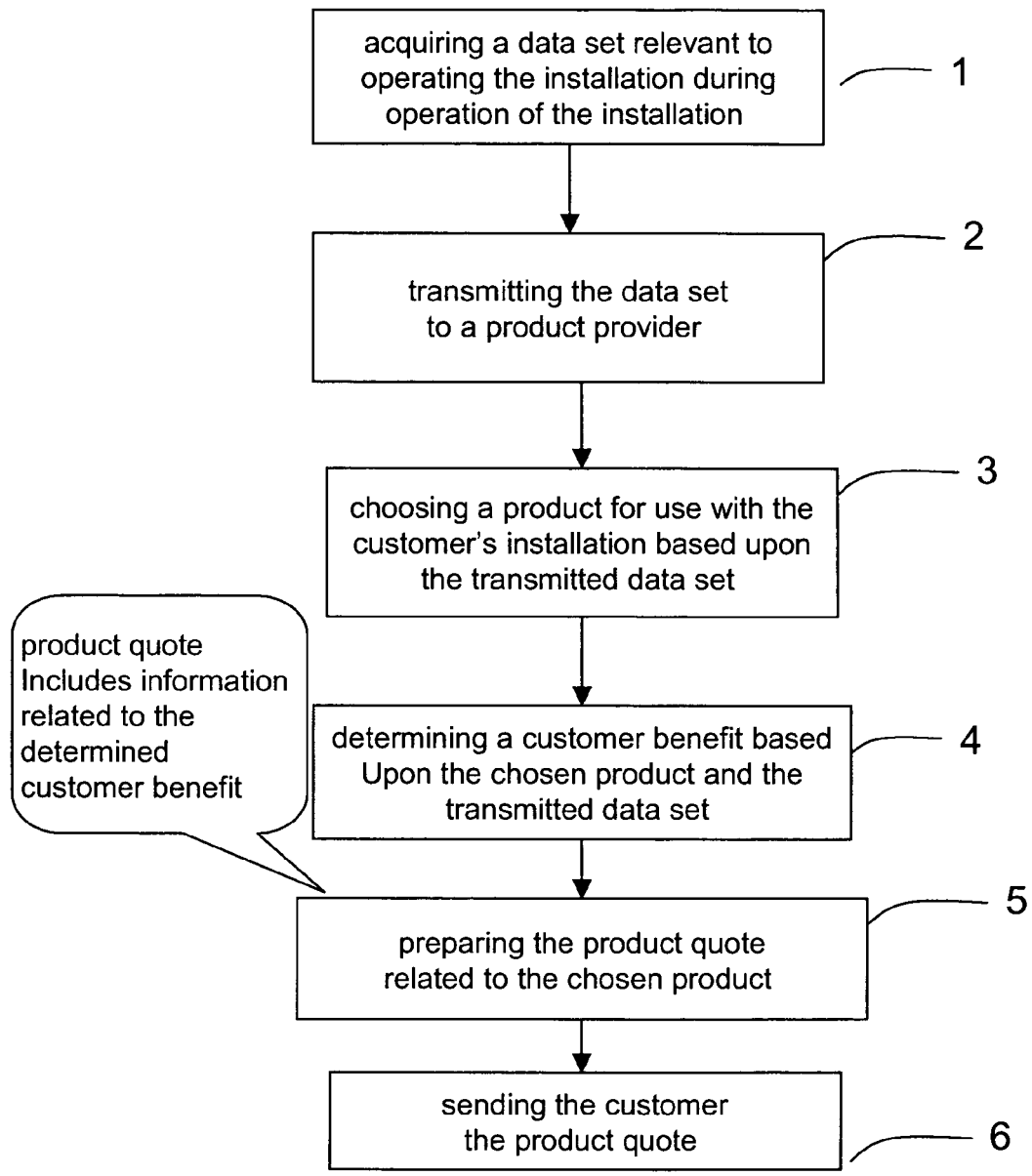
FIG. 1 is a flowchart of an exemplary process of the present invention showing an exemplary series of steps of preparing a quote for a customer.

FIG. 1 depicts a flowchart showing a series of exemplary steps that can be performed to monitor a facility according to the invention.

Step 1 provides acquiring a data set relevant to operating the installation during operation of the installation, which can be accomplished, for example, by sensors and local Programmable Logic Controllers (PLCs) mounted within the facility or by smart sensors which include at least some data preprocessing.

Step 2 involves transmitting the data set to a product provider, for example over a wireless transmission channel, a power line carrier, or the internet.

In Step 3, a product for use with the customer's installation is chosen, preferably from a product data base, based upon the transmitted data set, so that the product is expected to be an optimal choice for use with the installation.

Step 4 depicts determining a customer benefit based upon the chosen product and the transmitted data set. As mentioned before, the calculated benefit is thereby very reliable, because it is based on real operating conditions acquired during operation of the installation. The calculating device used for calculating the customer benefit can be implemented as a simulation mechanism, which includes a cost model related to the chosen product. The data set is thereby at least partially used as an input data set of the cost model, which determines a cost/benefit related output data set.

Step 5 and 6 involve finalizing and sending the quote, merging information related to the product (as extracted from the product data base in step 3) and the customer benefit (as calculated in step 4).

Figure 2:
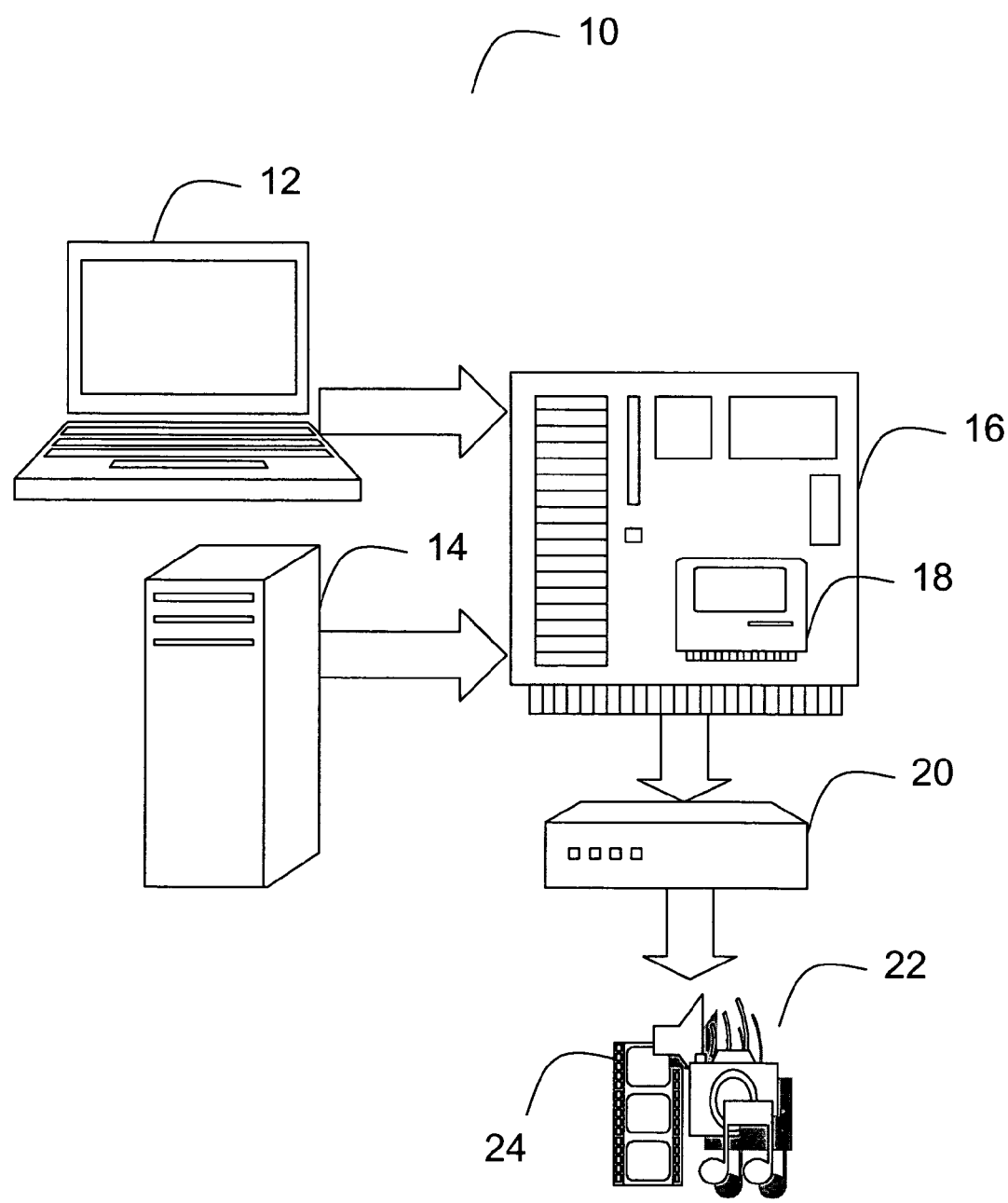
FIG. 2 is a schematic diagram of a computer system adapted to enable an embodiment of the invention.

FIG. 2 schematically illustrates a system 10 for preparing a product quote which enables an embodiment of the invention.

The system 10 includes a data reading device 12 for reading a data set relevant to the operation of the customer's installation. The data set, acquired during operation of the facility, thus relates to real operating conditions of the facility and may include online (real time) or logged data influencing the proper operation of the facility and its components such as sensor data originating at the components of the facility, for example fluid pressures, bearing temperatures, engine temperature, coolant temperatures, environmental temperatures, electric currents, electric voltages, switch settings, relay trips, closed/open status of doors, valves and so on. Those data indicate under which real operating conditions the facility's components are working.

A processing device 16 is employed for choosing a product from a product data base 14, wherein the choice is based on the data set, so that the chosen product meets the actual operating requirements of the installation.

A calculating device 18 is used for calculating a customer benefit 24. It is implemented as a simulation mechanism, which includes a cost model related to the chosen product and the customer's installation. The data set—reflecting the real (future) operating conditions under which the chosen product is to operate—is thereby at least partially used as an input data set of the cost model, which determines a cost/benefit related output data set.

A quote generator 20 finalizes the quote 22 by completing an electronic quote template. The quote 22 thereby includes information on the calculated customer benefit 24.

Such a quote 22 is very helpful to the customer, because it provides very accurate cost/benefit related information which can serve as a well-founded basis for a purchase decision.

In addition to the embodiments of the aspects of the present invention described above, those of skill in the art will be able to arrive at a variety of other arrangements and steps which, if not explicitly described in this document, nevertheless embody the principles of the invention and fall within the scope of the appended claims.

For example, the ordering of method steps is not necessarily fixed, but may be capable of being modified without departing from the scope and spirit of the present invention.

What is claimed is:

1. A method of preparing a product quote for a customer operating a technical installation comprising technical installation sensors which gather data regarding the actual physical operation conditions of the technical installation, comprising:
   using technical installation sensors to gather data regarding actual physical operating characteristics of technical installation components;
   acquiring a data set comprising the data gathered by the technical installation sensors, using a data reading device;
   transmitting the data set to a product provider;
   choosing a product for use with the customer's installation based upon the received data set, wherein the choice is made by the product provider;
   determining a customer benefit based upon the chosen product and the transmitted data set, using a calculating device;
   preparing the product quote related to the chosen product; and
   sending the customer the product quote, the product quote including the customer benefit.

2. The method according to claim 1, wherein the product includes an upgrade of a component the customer already operates.

3. The method according to claim 2, wherein the component is a software program.

4. The method according to claim 1, wherein the product is any of a hardware device and a software program.

5. The method according to claim 1, wherein the data set is regularly acquired and transmitted to the product provider during operation of the technical installation.

6. The method according to claim 5, wherein the product provider is a remote service provider to the customer.

7. The method according to claim 1, wherein the product quote is sent to the customer as an unsolicited quote.

8. The method according to claim 1, wherein the product quote is sent to the customer upon request.

9. A system for preparing a product quote for a customer operating a technical installation, comprising:
   a sensor for gathering a data set relevant to the physical characteristics of the technical installation during operation of the technical installation;
   a data reading device for reading the data set relevant to the operation of the technical installation;
   a product data base including product information of a plurality of products;
   a processing device adapted to choosing at least one product for use with the customer's technical installation out of the plurality of products based upon the data set; and
   a calculating device adapted to calculating a customer benefit based upon the chosen product and the data set.

10. The system according to claim 9, wherein the product is any of a hardware device, a software program and an upgrade of a product the customer already uses when operating the technical installation.

11. The system according to claim 9, further comprising:
    a quote generator adapted to creating the product quote, wherein the product quote includes at least part of the product information of the chosen product and the calculated customer benefit.

12. The system according to claim 11, further comprising:
    a mailing device adapted to sending the product quote to the customer.

13. The system according to claim 12, wherein the mailing system is an email system.

14. The system according to claim 12, wherein the mailing device is adapted to sending the product quote as an unsolicited quote.

15. The system according to claim 12, wherein the mailing device is adapted to sending the product quote upon a request of the customer.

16. The method according to claim 1, wherein the technical installation is selected from the group consisting of industrial plants, hotels, trains, and automobiles.

17. The method according to claim 1, wherein the customer benefit is an economic benefit calculated using a simulation mechanism, wherein the simulation mechanism simulates the technical installation if operated using the chosen product.

18. The system according to claim 9, wherein the customer benefit is an economic benefit calculated using a simulation mechanism, wherein the simulation mechanism simulates the technical installation if operated using the chosen product.

* * * * *